United States Patent
Maximus et al.

(10) Patent No.: US 7,692,866 B2
(45) Date of Patent: Apr. 6, 2010

(54) DISPLAY SYSTEMS WITH AND METHODS FOR MULTIPLE SOURCE COLOUR ILLUMINATION

(75) Inventors: Bart Maximus, Oudenaarde (BE); Rik Defever, Kuurne (BE)

(73) Assignee: Barco N.V., Kortrijk (BE)

( * ) Notice: Subject to any disclaimer, the term of this patent is extended or adjusted under 35 U.S.C. 154(b) by 144 days.

(21) Appl. No.: 11/289,281

(22) Filed: Nov. 30, 2005

(65) Prior Publication Data
US 2006/0132403 A1  Jun. 22, 2006

Related U.S. Application Data

(60) Provisional application No. 60/631,430, filed on Nov. 30, 2004.

(51) Int. Cl.
G02B 27/14 (2006.01)
(52) U.S. Cl. ..................... 359/634; 359/640
(58) Field of Classification Search .............. 359/634
See application file for complete search history.

(56) References Cited

U.S. PATENT DOCUMENTS

| | | | |
|---|---|---|---|
| 4,196,460 A * | 4/1980 | Schreckendgust | 362/231 |
| 2002/0154277 A1 | 10/2002 | Mukawa et al. | |
| 2004/0145792 A1 * | 7/2004 | Maeyama et al. | 359/239 |
| 2004/0263500 A1 | 12/2004 | Sakata | |
| 2004/0263802 A1 | 12/2004 | Seki et al. | |
| 2005/0231693 A1 | 10/2005 | Seki et al. | |

FOREIGN PATENT DOCUMENTS

| | | |
|---|---|---|
| CN | 1540394 | 10/2004 |
| EP | 1 161 103 | 12/2001 |
| JP | 7-284120 | 10/1995 |
| JP | 10-333599 | 12/1998 |
| JP | 2001-281599 | 10/2001 |
| JP | 2002-244211 | 8/2002 |
| JP | 2003-5714 | 1/2003 |

(Continued)

OTHER PUBLICATIONS

Summons to Attend Oral Proceedings ("the Summons") issued on Sep. 21, 2009 in related European patent application EP-A-1 662 802 (EP05447264.2)

(Continued)

Primary Examiner—Jordan M. Schwartz
Assistant Examiner—James C Jones
(74) Attorney, Agent, or Firm—Bacon & Thomas, PLLC (57) ABSTRACT

A color display (100, 200) for displaying an image is described wherein the color display (100, 200) is adapted for displaying a number of basic color light channels (102a, 102b, 102c). The color display (100, 200) comprises a basic color combiner (112, 212) for combining the basic colors and at least one basic color light channel (102a, 102b, 102c) comprising at least two light sources (104) having different spectral characteristics. The color display (100, 200) furthermore comprises an adjuster (106, 206) for adjusting a basic color by adjusting a relative proportion of a luminous output from the at least two light sources (104) in the basic color light channel (102a, 102b, 102c). A corresponding adjuster/controller, a multi-display system and a corresponding method for setting and/or adjusting a display system also is described.

17 Claims, 5 Drawing Sheets

FOREIGN PATENT DOCUMENTS

| | | |
|---|---|---|
| JP | 2003-516558 | 5/2003 |
| JP | 2003-283964 A | 10/2003 |
| JP | 2003-295315 | 10/2003 |
| JP | 2004-86159 | 3/2004 |
| JP | 2004-184852 | 7/2004 |
| JP | 2004-325477 | 11/2004 |
| JP | 2004-325630 | 11/2004 |
| JP | 2004-325643 | 11/2004 |
| JP | 2004-333758 | 11/2004 |
| WO | WO 01/43113 | 6/2001 |
| WO | WO 2004/039085 | 5/2004 |

OTHER PUBLICATIONS

E. H. Stupp "Projection Display" Wiley & Sons, Ltd. 1999.

* cited by examiner

DISPLAY SYSTEMS WITH AND METHODS FOR MULTIPLE SOURCE COLOUR ILLUMINATION

TECHNICAL FIELD OF THE INVENTION

The present invention relates to a display system for displaying images and methods therefor. More particularly, the present invention relates to a display system or multi-display system having an illumination system for high quality display of colour images, e.g. video films, television or camera pictures.

BACKGROUND OF THE INVENTION

For today's applications, high requirements are imposed on colour display systems such as projection displays. As the human eye is very sensitive to colour changes, it is an essential feature to obtain an optimum colour display. This includes both a high contrast and a good colour homogeneity, i.e. a reduced colour shift as well as a high colour purity, i.e. whereby the different colours generated in the colour display matches predetermined colour points as good as possible.

To obtain colour display and/or projection systems basically three different types of projection systems are known: a single imager spatial colour filter design, whereby each pixel is divided into three colour sub-pixels; a single imager colour field sequential system, whereby the beam is sequentially filtered into each primary colour which is then modulated in the single imager, and a two, three or multi-imager parallel colour system, whereby two, three or more light beams of basic colours each are directed onto a separate imager and the modulated colour beams are converged into a single beam for projection. As the latter system allows the highest throughput efficiency, i.e. higher than three times the throughput efficiency of the other systems, the use of a three-imager parallel colour system is common. In order to obtain colour images in colour displays, either light of different sources having a different wavelength or wavelength range can be used, or light of a white light source is used and split into a number of colours. Typically three basic colours or colour ranges are used, which correspond with the three primary colours red, green and blue.

Recently the use of light emitting diodes (LEDs) as light sources in projection systems has gained popularity. Typically red, green and blue LEDs are provided to generate the red, green and blue primary colour in a projection system. In order to fulfil the high brightness requirements, often a plurality of light emitting diodes are used in the same colour light channel. The plurality of light emitting diodes for the same colour light channel then are selected to have a predetermined specific colour whereby only small spectral variations are allowed. Such small spectral variations typically are translated as a peak wavelength difference being maximally 10 nm. In this way it is tried to have sufficient colour purity. Combination of the light beams of the different light emitting diodes in a single colour beam typically is based on positioning the different light emitting diodes close together.

Due to the significant increase in the number of large screen applications over the last decade, multi-display applications such as multi-projector display systems allowing tiled-wise displaying of images have become more popular. In such applications, colour differences between different tiles significantly reduce the quality of the image. As the human eye can detect very subtle colour shifts or brightness changes, the optical non-uniformity and asymmetry introduced at the borders of tiles can produce disturbing optical effects. The latter again poses stringent requirements on colour control in displays or projection systems.

SUMMARY OF THE INVENTION

It is an object of the present invention to provide improved apparatus or methods for displaying and/or projecting colour images. It is an advantage of some embodiments of the present invention that colour control of the generated colours can be obtained. It is also an advantage of some embodiments of the present invention that the colour points for the different generated colours in different multi-display or multi-projection systems can be adjusted to each other. It is furthermore an advantage of some embodiments of the present invention that control of colour points for generated colours can be done allowing correction for colour shifts occurring over time. It is also an advantage that such correction can be performed in an automated and/or automatic way. The above objective is accomplished by a method and device according to the present invention.

An aspect of the present invention provides a colour display for displaying an image, the colour display being adapted for displaying a number of basic colour light channels, the colour display comprising a basic colour combiner for combining the basic colours, at least one of the basic colour light channels comprising at least two light sources having a substantially different spectral characteristic, and an adjuster for adjusting a basic colour by adjusting a relative proportion of a luminous output from said at least two light sources in said basic colour light channel. The luminous output of each source determines the contribution of each source to the light output of the total system.

This can enable the colour points of the basic colours and/or of the combined basic colours to be adjusted. The latter can be easier than having to make adjustments to the picture signal being displayed, and can enable multiple displays to be used together more easily. The display can encompass projectors or backlit display panels for example. The basic colours and basic colour light channel may be primary colours and primary colour light channels respectively. The at least one basic colour light channel may be each basic colour light channel. The adjuster may comprise a means for adjusting a colour point of said at least one basic colour and/or of said combined basic colours.

The at least two light sources in said basic colour light channel may be light sources which have a relatively narrow bandwidth such as some light emitting devices, e.g. some light emitting diodes (LEDs), or LASERs. With a narrow bandwidth, may be meant substantially emitting in a wavelength range not larger than 200 nm, preferably not larger than 150 nm, more preferably not larger than 100 nm. Alternatively, a narrow bandwidth may be determined by the full width at half maximum (FWHM) for the emission peak being less than 50 nm.

The substantially different spectral characteristic may be a spectral characteristic wherein the peak wavelengths of the emission of the light sources may differ by 10 to 100 nm.

The display may comprise separate modulators, e.g. spatial modulators, for modulating each colour before the colours are combined. Alternatively, the display also may have a common modulator, light emanating from a light source (104) following a light path, the common modulator being positioned in the light path after the light combining system, for use by each colour in a time sequential way. With a common modulator positioned after the light combining system is meant a common modulator positioned in the light path downstream the light combining system. In the latter case the light combining system also being the basic colour combiner may incorporate a gate to allow only one colour at a time, in sequence. The basic colours then may be allowed to pass the gate of the basic colour combiner in sequence.

The adjuster may be synchronised to a timing of said modulating each basic colour in a time sequential way.

The adjuster may be arranged to modulate the at least two light sources in said basic colour light channel differently to alter their relative luminous output proportion.

The colour display also may comprise a sensor for detecting a colour point, the adjuster being arranged to adjust the relative proportion according to said detected colour point, detected by said sensor. This can encompass detecting the colour after combination, and/or detecting the colours separately before combination.

The colour display may be a projector or projection system or a backlit display panel.

Another aspect is a multidisplay system having more than one of the above-described colour displays, and a common adjuster for coupling the adjusters of each of the colour displays to maintain a correspondence between the basic colours of the colour displays.

In still another aspect, the invention relates to a method for adjusting a colour display, the method comprising determining a colour point for a basic colour or a combination of basic colours generated in basic colour light channels in said display and adjusting said colour point to a predetermined colour point by adjusting a relative proportion of the illumination of different light sources in at least one of said basic colour light channels.

In still a further aspect, the present invention relates to an adjuster for adjusting a luminous output of light sources, the adjuster being adapted for adjusting of a relative proportion of a luminous output of at least two light sources in a basic colour light channel of a display system as described above in order to alter a colour of a basic colour generated in said basic colour light channel.

Particular and preferred aspects of the invention are set out in the accompanying independent and dependent claims. Features from the dependent claims may be combined with features of the independent claims and with features of other dependent claims as appropriate and not merely as explicitly set out in the claims.

The teachings of the present invention permit the design of improved methods and apparatus for displaying colour images. The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In the different figures, the same reference signs refer to the same or analogous elements.

DEFINITIONS

The following terms are provided solely to aid in the understanding of the invention. These definitions should not be construed to have a scope less than understood by a person of ordinary skill in the art.

With "colour point" is meant the specific colour of a colour light beam. A description of colour can e.g. be provided by its tristimulus values X, Y, Z in the CIE colour space. The Y value represents contributions to the brightness perception of the human eye and it is called the brightness or luminance. A colour can also be described by Y and the colour functions x, y, z; where $$x = \frac{X}{X+Y+Z}, \quad y = \frac{Y}{X+Y+Z}, \quad z = \frac{Z}{X+Y+Z},$$

and x+y+z=1. Often colour is expressed only by its x-coordinate and y-coordinate, without indicating the brightness. An overview of different x, y coordinates for different colours is provided in the CIE 1976 U.C.S. Chromaticity Diagram, as defined by the "Commission Internationale de l'Eclairage" (CIE) in 1976. Colour point for a colour under study therefore may be determined by providing the x- and y-colour coordinate (CIEx, CIEy) for that colour in the CIE 1976 U.C.S. Chromaticity Diagram. Such colour definition is well known by the person skilled in the art. Other reference systems for defining colour also may be used.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
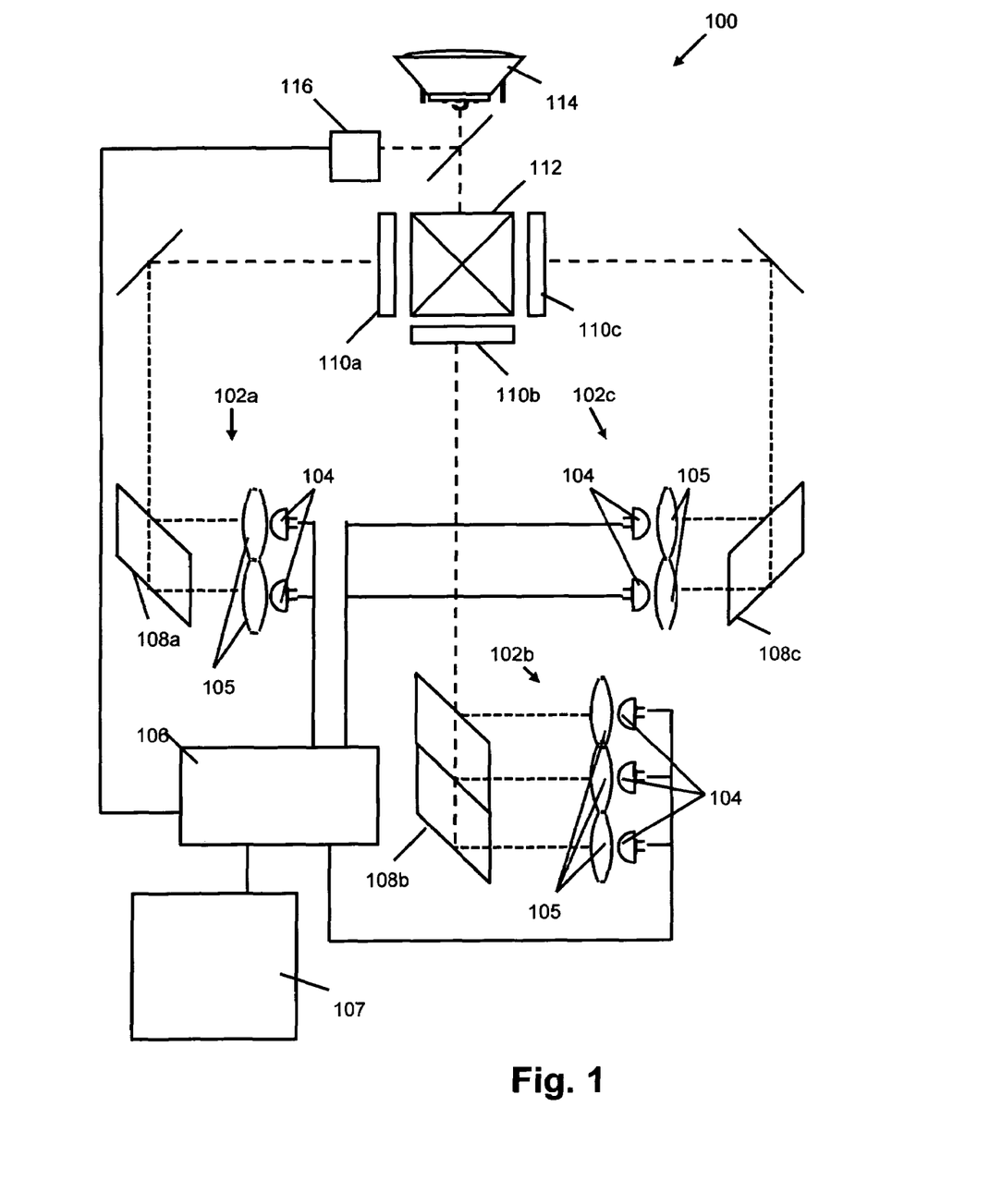
FIG. 1 shows an example of a display system with spatial light modulation in the different colour light channels, according to a first embodiment of the present invention.

In a first embodiment, the present invention relates to a display system for displaying colour images. The display system is a multi-channel colour display system. An example of a display system 100 according to the first embodiment of the present invention is shown in FIG. 1. The display system 100 of the first embodiment is adapted for displaying different colours by displaying a number of basic colour light channels 102a, 102b, 102c. Typically in colour displays the basic colours used are the primary colours red, green and blue (RGB) although the invention is not limited thereto. Different basic colours or a larger number of basic colours also may be used. E.g. the basic colours used may be RGB completed with white as an additional basic colour. Another example is the use of basic colours being red, green, blue and yellow and/or cyan. The display system 100 comprises a number of light sources 104, the total number of light sources 104 typically being larger than the number of basic colour light channels 102a, 102b, 102c. The light sources 104 typically are imaged onto an aperture, an optical component or a modulator, e.g. using standard optical elements 105, thus providing a specific light path. The light sources 104 used may be any suitable light source, e.g. a light source emitting in a specific colour region, which can be expressed as a light source having a colour in a specific region of the CIE chromaticity diagram. The light sources 104 may be for example light emitting devices, such as light emitting diodes (LEDs), lasers, but also filtered white light sources. According to an aspect of the present invention, for the formation of the light of a basic colour, in at least one basic colour light channel 102a, 102b, 102c more than one light source 104 is used. In the present embodiment illustrated in FIG. 1, two light sources 104 are used in a first basic colour light channel 102a, three light sources 104 are used in a second basic colour light channel 102b and two light sources 104 are used in a third basic colour light channel 102c. In other words, in at least one basic colour light channel 102a, 102b, 102c, possibly in all basic colour light channels of a display system, two or more light sources 104 are combined to form the basic colour, whereby the basic colour is determined by adjusting a relative proportion of a luminous output for each of said two or more light sources 104. The latter is performed by an adjuster 106, which may control the relative proportion of luminous output that is contributed by each of the light sources 104 used in the basic colour light channel 102a, 102b, 102c. With relative proportion there is meant a proportion relative to each other, it is proportions balanced such that the two luminous outputs contribute such that the right target colour is achieved. In other words with relative proportions of the luminous output contributed by the light sources 104 there is meant that the spectra of the different light sources 104 are balanced in intensity by giving them a certain weight such that the right target colour is achieved. The two or more light sources 104 thereby have a substantially different spectral characteristic. As will be described later, in some multi-channel embodiments, typically a colour recombination system such as e.g. an X-cube may be used. Although in the present embodiment in one colour channel light sources 104 are used having a substantially different spectral characteristic, the spectral characteristics preferably are selected such that the colour recombination for each of the light sources in the colour channel occurs in the same way, i.e. along the same light path. Light sources having a substantially different spectral characteristic may e.g. be light sources having a substantial difference in peak emission wavelength or a substantial difference in average emission wavelength. The substantial difference in peak emission wavelength or the substantial difference in average emission wavelength may e.g. be a difference of at least 10 nm, e.g. be a difference of at least 20 nm or e.g. a difference in the range 10 nm to 100 nm. The spectral characteristic of the light sources 104 may be a narrow bandwidth characteristic, or in other words, the light sources 104 may emit in a narrow spectral wavelength range. With a narrow bandwidth may be meant substantially emitting in a wavelength range not larger than 200 nm, preferably not larger than 150 nm, more preferably not larger than 100 nm. In case of light emitting devices, such as light emitting diodes (LEDs), light sources having a substantially different spectral characteristic may be selected by selecting different subtypes of light emitting devices, such as light emitting diodes (LEDs).

In the at least one basic colour light channel 102a, 102b, 102c thus a plurality of light sources 104 may be used, some possibly having the same spectral characteristic, but at least two light sources 104 in that basic colour light channel 102a, 102b, 102c having a substantially different spectral characteristic. Determining/adjusting a basic colour or a combination of basic colours may be done by the adjuster by adjusting a colour point of that basic colour or a colour point of that combination of basic colours. The latter may be performed for example in order to shift the colour point to a predetermined colour point or in order to make colour points of different display systems equal. The colour point of the basic colour thus may be defined by the colour point of the light sources 104 with substantially different spectral characteristics and their contribution to the total light output.

Figure 2:
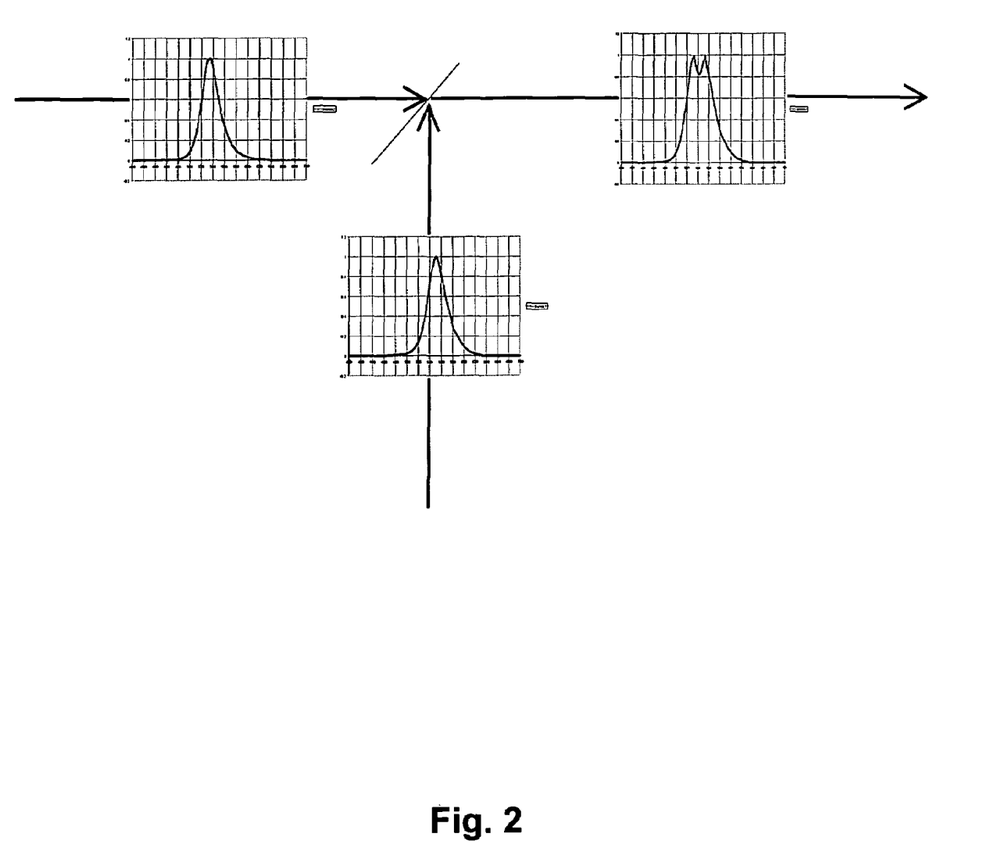
FIG. 2 is an illustration of the obtained emission spectrum upon combination of a first emission spectrum and a second emission spectrum according to a principle as used in embodiments of the present invention.

The principle for adjusting the colour of a basic colour in a basic colour light channel 102a, 102b, 102c by combining light sources 104 with substantially different spectral characteristics is illustrated by way of example for two light sources 104 in FIG. 2. FIG. 2 illustrates the resulting spectrum of the combination of emission from two light sources 104 having a substantially narrow spectral characteristic with a single peak. In combination, the spectral characteristics overlap, so the characteristic after combining is a broader characteristic with a twin peak. By adjusting the relative proportions before combination, a "centre wavelength" of the broader characteristic can be moved as desired.

The adjuster 106 may be in the form of a current control system which is used to control the supply current to the light sources 104 per basic colour light channel 102a, 102b, 102c with at least two light sources 104 having a substantially different spectral characteristic, i.e. by pulsing the supply currents or lowering the current levels in general. It is an advantage that the displayed colours are balanced on the screen. It is to be noted that there might be some changes in the color point from the color channels to the screen because of colorimetric influences by some optical elements like the light modulators, the recombination element, the projection lens, . . . . It is an advantage of embodiments of the present invention that the colour can be balanced on the screen and that a colour point can be balanced to a predetermined colour point. The predetermined colour point may be a colour point of another projector, e.g. in a multi-projection system, or a colour point determined by a certain target requirement. A common adjuster 106 may be used providing the function for each of the at least one basic colour light channel 102a, 102b, 102c or a specific adjuster (not shown in FIG. 2) may be used for each of the at least one basic colour light channel 102a, 102b, 102c. Besides a current control system, the adjuster 106 alternatively also may be any other suitable system for selecting an average luminous output of each light source, such as for example a mechanical system comprising a shutter or a dimmer for each light source 104 in the basic colour light channel 102a, 102b, 102c. The luminous output of the light sources thus may be influenced directly by reducing the effective luminous output of the light source or indirectly by blocking part of the effective luminous output of the light source. A means for storing 107 for storing information related to the adjusting of the average luminous output of the different light sources 104 may be provided. The information may be a model for the control signals for adjusting the average luminous output of the different light sources 104. Such a means for storing may be implemented as a stored sequence using conventional logic and memory circuitry for example, although the invention is not limited thereto. The means for storing 107 may be incorporated in or may be part of the adjuster 106.

In order to have an appropriate mixing of the light of the light sources 104 having a substantially different spectral characteristic in a basic colour light channel 102a, 102b, 102c, typically a light combination system 108a, 108b, 108c may be provided in the light path of the at least one basic colour light channel 102a, 102b, 102c having light sources 104 with substantially different spectral characteristics. Such a light combination system 108a, 108b, 108c may be one or more dichroic filters, interference filters, holographic filters or dichroic prisms such as e.g. an X-cube. The transmission and reflection characteristics of the dichroic filters, interference filters or dichroic prisms preferably are chosen so that the total recombined luminous output is higher than the light output in a system using one of the light sources 104 or all the light sources 104 of the basic colour light channel having the same spectral characteristic. If light valves are provided (see below) and are using polarised light, it may be preferable to use e.g. an SPS X-cube, where there is an overlap in spectral band of the P-polarised green light and the S-polarised red and blue light. In such a light combination means, light from a neighbouring colour is more likely to be able to contribute in a neighbouring colour channel. E.g. although the p-polarised component of the green light typically is substantially transmitted in the green channel, the s-polarised component of the green light still is substantially present to contribute in the blue channel, if desired. Use of an SPS X-cube also allows more flexibility, e.g. by allowing a little bit more bluish light in a green channel, a higher light output and an improved range of colour point adjustment may be obtained.

Such a system could e.g. be obtained by removing the dichroic filter or by replacing it by an ideal mirror, depending on the specific set-up used.

Each of the basic colour light beams typically may be further directed, optionally using further optics, to a modulator 110a, 110b, 110c, e.g. a spatial light modulator, for controlling the displayed picture according to an input signal. The latter can be achieved by a light valve, such as a spatial light modulators assembly like e.g. a deformable mirror device (DMD) engine, a liquid crystal display (LCD) engine or a liquid crystal on silicon (LCOS) engine. It can comprise either transmissive or reflective light modulators. Transmissive devices modulate the light beam as it passes through the unit. Reflective devices modulate the light beam as it reflects from a mirror inside the unit. Alternatively, the light sources may be modulated according to established principles known by the person skilled in the art, in order to obtain light beams comprising picture information.

After the basic colour light beams have been modulated so as to comprise picture information, the basic colour light channels may be combined using a basic colour combiner 112. The latter may e.g. be an X-cube although the invention is not limited thereto. The combined basic colour light beams then are directed towards a projection lens 114.

Optionally one or more optical sensors 116 can be placed in the light path of at least one basic colour light channel 102a, 102b, 102c, e.g. in each basic colour light channel 102a, 102b, 102c. The optical sensor 116 can be placed either before the basic colour combiner 112 or in the light path of the recombined light beam downstream the basic colour combiner 112. The sensor can be placed at the screen or aiming at the screen so that the colors can be checked over there, e.g. such that a colour point can be measured overthere. The optical sensor or optical sensors 116 can for example be spectrally sensitive, so that the light output and colour point can be monitored and fed back to the adjuster 106 of the light sources 104. In this way the light output can be adapted until a predetermined colour point is reached. The system thus can be used as an automated and/or automatic feed back loop for correcting for colour shifts over time.

Figure 3:
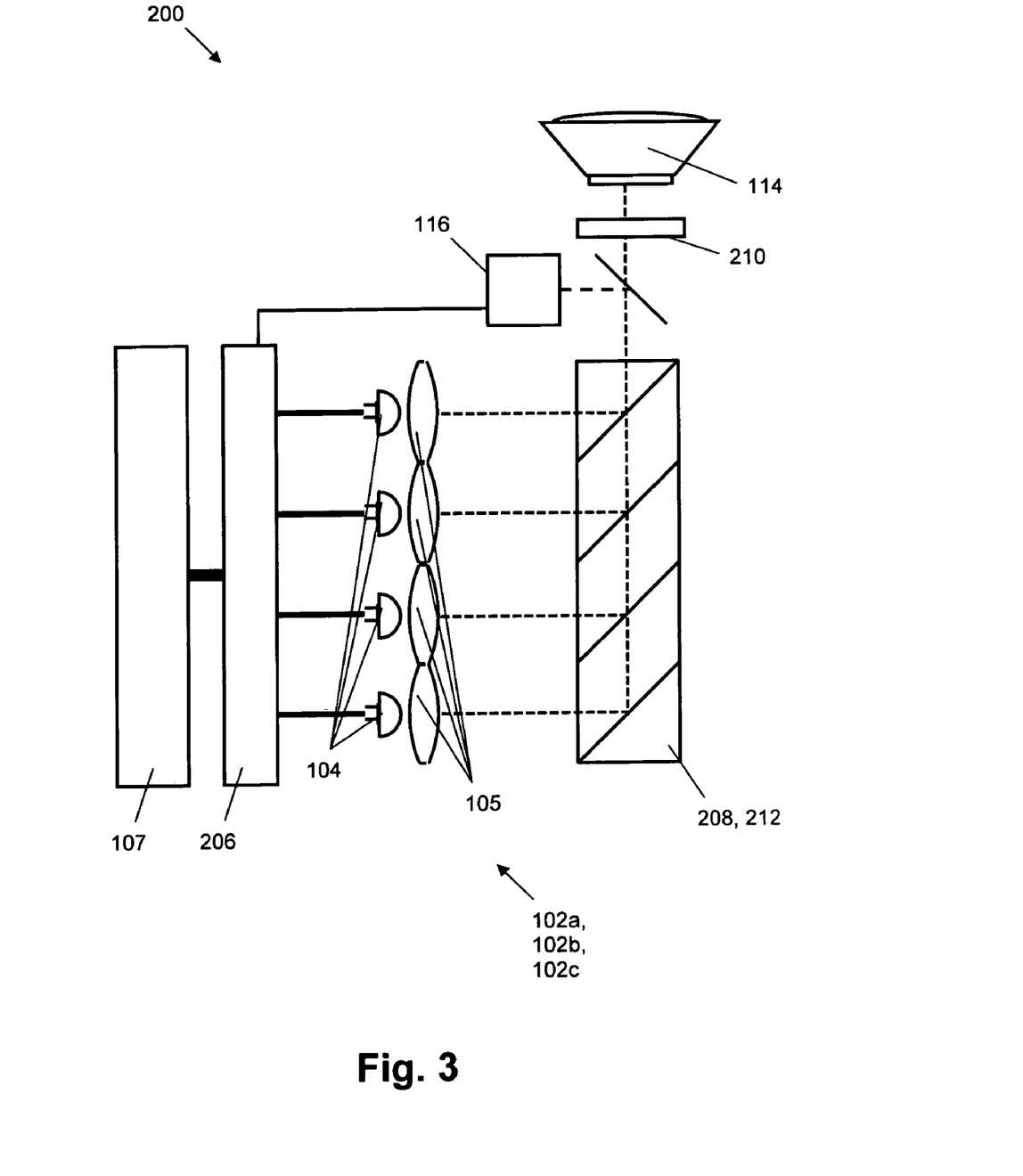
FIG. 3 shows an example of a display system with time-sequential colour modulation according to a second embodiment of the present invention.

In a second embodiment, the present invention also relates to a display system for displaying colour images, but wherein a time sequential colour illumination technique is applied. The display system is a multi-channel colour display system. An example of a display system 200 according to the second embodiment of the present invention is shown in FIG. 3. The display system 200 operates according to the same principle, allowing to determine the colour of a basic colour by using, in a single basic colour light channel 102a, 102b, 102c, at least two light sources 104 having a substantially different spectral characteristic. The basic colour light channels 102a, 102b, 102c refer to at least partially the same physical channel, but at different basic colour situations, i.e. at different timings in the timing sequence. The display system 200 thus is adapted for displaying different colours by time-sequentially displaying a number of basic colours using basic colour light channels 102a, 102b, 102c. The number of basic colour light channels 102a, 102b, 102c corresponds to the number of basic colours used for displaying the colour image. The basic colours may be primary colours or other colours and the number of colours is not limited to three as described in more detail in the first embodiment.

The number of light sources 104 may be equal to or larger than the number of basic colour light channels 102a, 102b, 102c. The light sources 104 typically are imaged on an aperture, an optical component or a modulator, e.g. using standard optical elements 105, thus providing a specific light path. The light sources 104 may be of the same type and may have the same properties as the light sources 104 described in the first embodiment. As described above, in the present embodiment, the basic colour light channels 102a, 102b, 102c are used time-sequentially, meaning that the basic colours are generated sequentially and not at the same moment in time. The basic colour light channels 102a, 102b, 102c therefore can use components of the device or part of the light path used in other basic colour light channels 102a, 102b, 102c. The basic colour light channels 102a, 102b, 102c can e.g. all control/use the same light sources 104, can control/use partly the same light sources 104 as used in other basic colour light channels 102a, 102b, 102c or can control/use different light sources 104 in some or in each basic colour light channel 102a, 102b, 102c. In the example display system of FIG. 3, by way of illustration the number of basic colour light channels is 3 and the number of light sources is 4, whereby all light sources are controlled for the three basic colour light channels 102a, 102b, 102c.

As described above, in at least one colour light channel 102a, 102b, 102c of the display system 200, at least two light sources 104 may have a substantially different spectral characteristic. Light sources having a substantially different spectral characteristic may e.g. be light sources having a substantial difference in peak emission wavelength or a substantial difference in average emission wavelength. The substantial difference in peak emission wavelength or a substantial difference in average emission wavelength may e.g. be a difference of at least 10 nm, e.g. be a difference of at least 20 nm or e.g. a difference in the range 10 nm to 100 nm. The spectral characteristic of the light sources 104 may be a narrow band-with characteristic, or in other words, the light sources 104 may emit in a narrow spectral wavelength range. With a narrow bandwidth, may be meant substantially emitting in a wavelength range not larger than 200 nm, preferably not larger than 150 nm, more preferably not larger than 100 nm. Alternatively, a narrow bandwidth may be determined by the full width at half maximum (FWHM) for the emission peak being less than 50 nm.

In case of light emitting devices, such as light emitting diodes (LEDs), light sources having a substantially different spectral characteristic may be selected by selecting different subtypes of light emitting devices, such as light emitting diodes (LEDs).

In the present embodiment, the display system 200 also comprises an adjuster 206 for adjusting the relative proportion of a luminous output of the light sources 104 used in a basic colour light channel 102a, 102b, 102c. For each basic colour light channel 102a, 102b, 102c, the light sources 104 being part of that basic colour light channel 102a, 102b, 102c may be driven with different intensity levels thus composing the basic colour for that basic colour light channel 102a, 102b, 102c. After a first basic colour light beam is generated and used, the same or other light sources are driven to generate a second basic colour light beam, possibly followed by driving of the same or other light sources to generate a further basic colour light beam. The latter is repeated for each of the basic colours after which the colour-sequential illumination cycle is restarted. It is an advantage of the present embodiment that the relative proportion of the luminous output of the different light sources 104 used in a basic colour light channel can be adjusted, as this allows to adjust the colour of a basic colour light beam, e.g. to set the basic colour light beam to a specific colour point. The adjuster 206 may adjust the relative proportion of a luminous output of the light sources 104 used in a basic colour light channel by separately controlling the luminous output of these light sources 104. The adjuster 206 furthermore may control the relative proportion of a luminous output of the light sources 104 separately within each basic colour light channel 102a, 102b, 102c, i.e. in the different parts in the illumination sequence. Consequently, a time-sequential adjustment of the light sources 104 may be performed, in agreement with the time-sequential basic colour illumination.

In the present embodiment, the intensity levels thus in other words may be controlled so that the colour point of each basic colour equals a predetermined colour point for that basic colour. The latter may be for example a colour point being constant over time, or constant during the dimming of the light sources 104, e.g. LEDs, or constant when the temperature of the light sources 104, e.g. LEDs is changing. A means for storing 107 for storing information related to the adjusting of the average luminous output of the different light sources 104 in the different basic colour light channels 102a, 102b, 102c may be provided. The information may be a model for the control signals for adjusting the average luminous output of the different light sources 104 in the different basic colour light channels 102a, 102b, 102c. Such a means for storing 107 may be implemented as a stored sequence using conventional logic and memory circuitry for example, although the invention is not limited thereto. The means for storing 107 may be incorporated in or may be part of the adjuster 206. Alternatively, the means for storing 107 may be a separate element.

Figure 4:
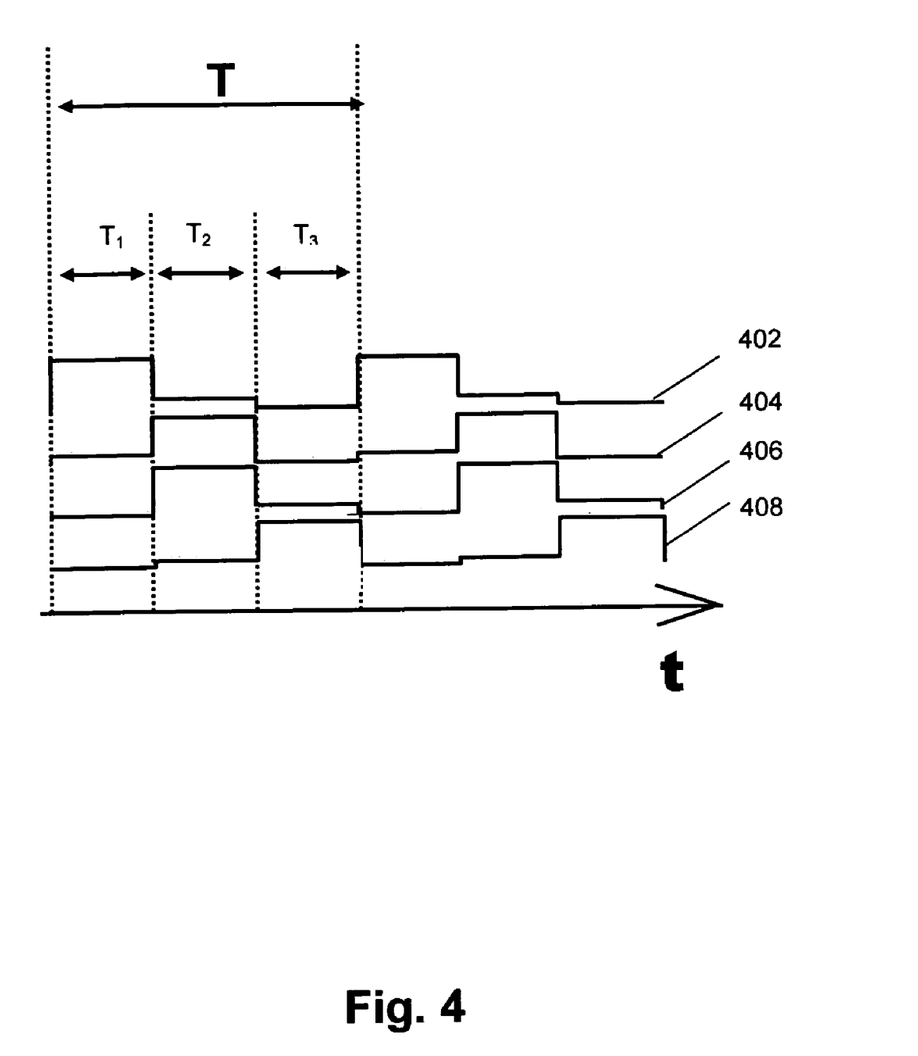
FIG. 4 shows an example of the different driving signals for driving the light sources, used in the different colour light channels of a display system represented in FIG. 3.

In the example shown in FIG. 3 where the 4 light sources 104 are controlled for each of the 3 colour light channels 102a, 102b, 102c, 12 separate luminous output levels are provided during a cycle of the colour sequential illumination. In this example, a red, a first green, a second green substantially different from the first green and a blue light source 104 are present. It is to be noticed that some of the luminous output levels can be 0. FIG. 4 shows the separate luminous output levels for the different light sources 104 during different time periods of a cycle of the colour-sequential illumination. Signal 402 illustrates the driving level for a red light source in the example display system 200 of FIG. 3, signal 404 illustrates the driving level for a first green light source in the example display system 200 of FIG. 3, signal 406 illustrates the driving intensity for a second green light source and signal 408 illustrates the driving intensity of the blue light source in the example display system 200 of FIG. 3. Time period $T_1$ thereby corresponds to the time wherein the red basic colour illumination is performed, time period $T_2$ corresponds to the time wherein the green basic colour illumination is performed and time period $T_3$ corresponds to the time wherein the blue basic colour illumination is performed.

The display system 200 typically also may comprise at least one light combination system 208 that may be used or partly used in each of the basic colour light channels 102a, 102b, 102c. Such a light combination system 208 may be one or more dichroic filters, interference filters, holographic filters or dichroic prisms such as e.g. an X-cube. In the present embodiment, the light combination system 208 also brings the different basic colour beams on the same light path thus acting as a basic colour combiner 212. Furthermore, in the display system 200 with time-sequential colour illumination, a single common modulator 210 typically may be used providing sequences of image information for the different basic colours in the image. Such a single common modulator 210 may be a light valve, such as a spatial light modulators assembly like e.g. a deformable mirror device (DMD) engine, a liquid crystal display (LCD) engine or a liquid crystal on silicon (LCOS) engine. It can comprise either transmissive or reflective light modulators. Transmissive devices modulate the light beam as it passes through the unit. Reflective devices modulate the light as it reflects from a mirror inside the unit. Alternatively, the light sources 104 may be modulated according to established principles known by the person skilled in the art, in order to obtain light beams comprising picture information. The modulated basic colour light beams then are directed towards a projection lens 114.

Similar as in the first embodiment, one or more optical sensors 116 can be optionally placed in the light path of at least one basic colour light channel 102a, 102b, 102c. The colour sensor 116 can be used in the light path to control the actual colour point or the spectral composition of the sequences of light that is used to illuminate the modulator 210. The sensor can be placed at the screen or aiming at the screen so that the colors can be checked there, e.g. such that a colour point can be measured there. The sensor 116 typically may perform analysis for the different sequences for the different basic colours that are sequentially presented to the modulator 210. The optical sensor or optical sensors 116 can for example be spectrally sensitive, so that the light output and colour point can be monitored and fed back to the adjuster 106 of the light sources 104. In this way the light output can be adapted until a predetermined colour point is reached. The system thus can be used as an automated and/or automatic feed back loop for correcting for colour shifts over time.

Figure 5:
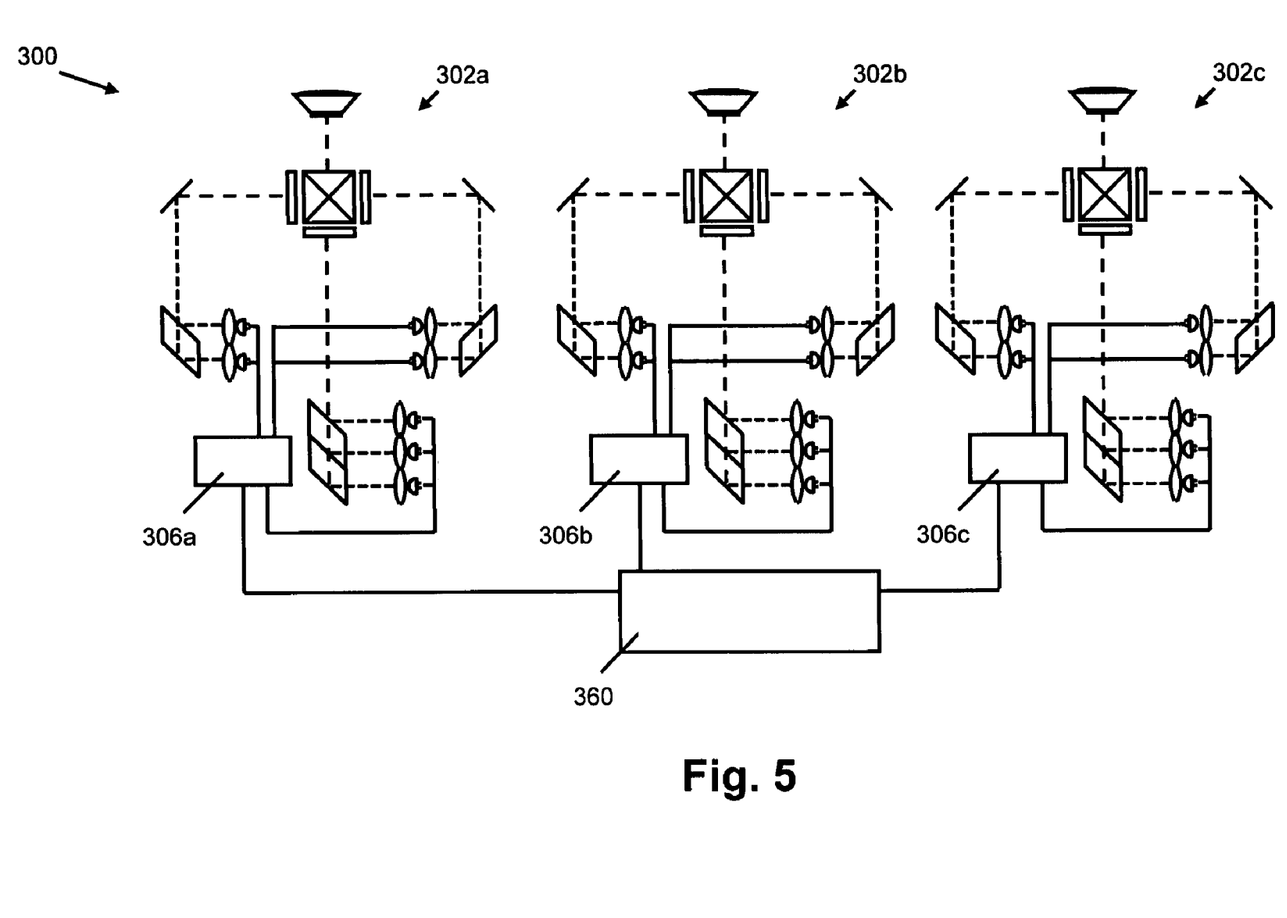
FIG. 5 shows an example of a multi-display system according to a third embodiment of the present invention.

In a third embodiment, the present invention relates to a multi-display system comprising at least two displays according to any of embodiments 1 or 2, wherein a basic colour adjustment system is provided in order to allow to set the basic colours in each display equally. An example of such a multi-display system 300 is illustrated in FIG. 5, indicating a number of display systems 302a, 302b, 302c each having an adjuster 306a, 306b, 306b for adjusting a colour of at least one basic colour of a display system 302a, 302b, 302c by adjusting a relative proportion of a luminous output for at least two light sources having a substantially different spectral characteristic in a corresponding basic colour light channel, and a common adjuster 360 which is linking the adjustments provided by adjusters 306a, 306b, 306c in order to set basic colours in different displays 302a, 302b, 302c of a multi-display system 300 equal. Alternatively, the adjusters 306a, 306b, 306c also may be comprised in a single adjuster 360 linking the adjustment signals thus allowing to set basic colours in different displays 302a, 302b, 302c of a multi-display system 300 equal. Similar as for the separate display systems, a detector system (not represented in the drawings) may be present allowing to automatically or automated adjustment of a colour of basic colours in the display systems 302a, 302b, 302c.

It is an advantage of embodiments of the present invention that adjustment to basic colours as well as adjustment to combinations of basic colours can be performed. Adjustment of e.g. the white point of the display and the intensity can in particular embodiments with basic colours RGB be obtained by balancing the contribution of these three basic colours red, green and blue. Also adjustment of other colours being a combination of some or all basic colours may be performed by adjusting the contribution of the basic colours in the system.

It is to be understood that although preferred embodiments, specific constructions and configurations, as well as materials, have been discussed herein for devices according to the present invention, various changes or modifications in form and detail may be made without departing from the scope and spirit of this invention. For example, although the embodiments described above are related to display systems or multi-display systems, the present invention also relates to methods for setting/adjusting a colour display. The method typically comprises determining a colour point for a basic colour of a combination of basic colours generated in basic colour light channels in the display and adjusting the colour point to a predetermined colour point by adjusting a relative proportion of the illumination of different light sources in at least one of the basic colour light channels. Furthermore, the present invention also relates to an adjuster, which also may be referred to as a controller, whereby the adjuster is adapted for performing adjustment of the relative proportion of the luminous output of at least two light sources in a basic colour light channel in order to adjust the colour of the basic colour generated in the basic colour light channel. Such an adjuster/controller may especially be adapted to operate in display systems as described in one of the above embodiments. The adjuster/controller therefore may have all features as described for the adjuster/controller in one of the above embodiments.

The invention claimed is:

1. A color display for displaying an image by displaying a number of basic color light channels, the color display comprising a basic color combiner for combining the basic colors, at least one basic color light channel comprising at least two light sources having different spectral characteristics, and comprising an adjuster for adjusting a basic color by adjusting a proportion of a simultaneous luminous output from said at least two light sources in said basic color light channel, said proportion being the luminous output of one of said at least two light sources relative to the luminous output of the other of said at least two light sources, said adjusting of the basic color being performed by adjustment of a color point of said basic color in order to shift said color point to a predetermined color point.

2. A color display according to claim 1, said adjuster adjusting a color point of said at least one basic color and of said combined basic colors.

3. A color display according to claim 1, wherein said at least two light sources in said basic color light channel are light sources having a narrow bandwidth.

4. A color display according to claim 1, wherein said light sources are light emitting diodes or lasers.

5. A color display according to claim 1, the light sources having different spectral characteristics with a different peak wavelength, wherein the peak wavelengths of the light sources differ by 10 nm to 100 nm.

6. A color display according to claim 1, the color display comprising a light combining system for combining light of said at least two light sources having a substantially different spectral characteristic of said at least one basic color light channel.

7. A color display according to claim 1, the color display further comprising separate modulators for modulating each basic color separately before they are combined.

8. A color display according to claim 1, light emanating from a light source following a light path, the color display comprising a common modulator positioned in the light path after the combiner, for modulating each basic color in a time-sequential way.

9. A color display according to claim 8, wherein the combiner has a gate to allow only one basic color at a time.

10. A color display according to claim 8, the adjuster being synchronized to a timing of said modulating each basic color in a time-sequential way.

11. A color display according to claim 1, the adjuster being arranged to adjust said at least two light sources in said basic color light channel differently to alter the relative proportion.

12. A color display according to claim 1, the color display further comprising a sensor for detecting a color point, the adjuster being arranged to adjust the relative proportion according to said detected color point.

13. A color display according to claim 12, light emanating from a light source following a light path, wherein said sensor for detecting a color point is positioned in the light path upstream and/or downstream said combiner.

14. A color display according to claim 1, the color display being a projector or a backlit display panel.

15. A multi-display system comprising at least two displays, the displays being in accordance with claim 1, the multi-display system further comprising a common adjuster for coupling the adjusters of each of said displays such that a correspondence between the primary color of the displays is maintained.

16. An adjuster for adjusting a luminous output of light sources, the adjuster being adapted for adjusting of a relative proportion of a simultaneous luminous output of at least two light sources in a basic color light channel of a display system according to claim 1, in order to alter a color of a basic color generated in said basic color light channel.

17. A method for setting and/or adjusting a color display, the method comprising:

determining a color point for a basic color or a combination of basic colors generated in basic color light channels in said display setting and adjusting said color point to a predetermined color point by adjusting a relative proportion of the simultaneous illumination of different light sources in at least one of said basic color light channels, said proportion being the luminous output of one of said different light sources relative to the luminous output of the others of said different light sources.

* * * * *